United States Patent [19]

Thario et al.

[11] Patent Number: 5,657,079
[45] Date of Patent: Aug. 12, 1997

[54] CORRECTION FOR MONITOR REFRACTION USING EMPIRICALLY DERIVED DATA

[75] Inventors: James E. Thario, Denver; James R. Webb, Boulder, both of Colo.

[73] Assignee: Display Laboratories, Inc., Boulder, Colo.

[21] Appl. No.: 617,322

[22] Filed: Mar. 18, 1996

Related U.S. Application Data

[63] Continuation of Ser. No. 258,695, Jun. 13, 1994, Pat. No. 5,510,833.
[51] Int. Cl.$^6$ .................................................. H04N 17/04
[52] U.S. Cl. .................... 348/190; 348/807; 315/368.12
[58] Field of Search .................................. 348/180, 181, 348/189, 190, 191, 806, 807; 315/366, 368.12, 368.13; 364/742; H04N 17/04

[56] References Cited

U.S. PATENT DOCUMENTS

| | | | |
|---|---|---|---|
| 3,995,269 | 11/1976 | Schumacher | 315/377 |
| 4,058,826 | 11/1977 | Schneider | 358/10 |
| 4,506,292 | 3/1985 | Newton et al. | 358/34 |
| 4,523,188 | 6/1985 | Huber | 340/734 |
| 4,654,706 | 3/1987 | Davidson et al. | 358/139 |
| 4,672,275 | 6/1987 | Ando | 358/10 |
| 4,757,239 | 7/1988 | Starkey, IV | 315/371 |
| 4,772,948 | 9/1988 | Irvin | 358/139 |
| 4,816,908 | 3/1989 | Colineau et al. | 358/60 |
| 4,817,038 | 3/1989 | Knoll et al. | 364/571.04 |
| 4,857,998 | 8/1989 | Tsujihara et al. | 348/190 |
| 4,897,721 | 1/1990 | Young et al. | 358/139 |
| 4,952,851 | 8/1990 | Macaulay | 315/398 |

(List continued on next page.)

FOREIGN PATENT DOCUMENTS

| | | | |
|---|---|---|---|
| 0404700 | 12/1990 | European Pat. Off. | H04N 17/04 |
| 0448267 | 9/1991 | European Pat. Off. | H04N 17/04 |
| 0257096 | 11/1986 | Japan | H04N 17/04 |

OTHER PUBLICATIONS

Charles Chuang et al; A Non-impact High Resolution Geometry Alignment System for Monitor Production. Paper given at Society for Information Display, San Jose, California, Jun. 1994.

Kern, "CRT Display Inspection With a Solid State Camera—3D Modelling and Parallax Correction", 1994, pp. 1–4.
James R. Webb, Micro–Chip Architecture for Full Digital Control of Geometry, Convergence and Colorimetry in CRT Monitors, Jun. 1994.

(List continued on next page.)

*Primary Examiner*—John K. Peng
*Assistant Examiner*—Jeffrey S. Murrell
*Attorney, Agent, or Firm*—William W. Cochran, II; Holland & Hart LLP

[57] ABSTRACT

A system for transforming coordinate systems in an automated video monitor alignment system includes a camera and computer to capture an image of the display bezel surrounding the cathode ray tube and of the image displayed on the CRT. Three dimensional models of the CRT tube and display bezel are used to compute and compensate for camera perspective. Camera pixel data can then be transformed to 'flat plane' coordinates. When the relative orientation of the camera and CRT are corrected, the effects of parallax can be eliminated, allowing more accurate inspection, measurement, and lower cost fixturing on the production line. Thus, an accurate coordinate transformation from a camera-referenced coordinate system to a monitor-referenced coordinate system is made. Correction factors for correcting errors due to refraction can also be generated empirically in accordance with the present invention. Slope coordinate data is generated for a sample monitor for predetermined slope coordinate locations on the tube face. Correction signals can be generated from the slope coordinate data and measured tilt angles of the monitor relative to the vision system. Two dimensional interpolation techniques can be employed to provide slope coordinate values and correction signals for video signals that do not physically match the location of the slope coordinate locations of the sample monitor.

4 Claims, 12 Drawing Sheets

U.S. PATENT DOCUMENTS

| | | | |
|---|---|---|---|
| 5,020,116 | 5/1991 | Macaulay | 358/60 |
| 5,059,979 | 10/1991 | Micic et al. | 341/152 |
| 5,081,523 | 1/1992 | Frazier | 358/29 |
| 5,216,504 | 6/1993 | Webb et al. | 358/139 |
| 5,276,458 | 1/1994 | Sawdon | 345/132 |
| 5,432,548 | 7/1995 | Byen et al. | 348/180 |
| 5,440,340 | 8/1995 | Tsurutani et al. | 348/190 |
| 5,504,521 | 4/1996 | Webb et al. | 348/180 |
| 5,510,833 | 4/1996 | Webb et al. | 348/190 |
| 5,532,765 | 7/1996 | Inoue et al. | 348/807 |

OTHER PUBLICATIONS

Society for Information Display International Symposium, Digest of Technical Papers, vol. XXV, Jun. 14–16, 1994.

CRT Display Inspection with a Solid State Camera, by Gregory A. Kern. Paper given at Society for Information Display, San Jose, California, Jun. 1994.

Firmware for a Continuous Frequency CRT Monitor, by Steven J. Lassman. Paper given at Society for Information Display, San Jose, California, Jun. 1994.

Society for Information Display, Digest of Technical Papers, Feb. 6–8, 1996.

IEEE 1988 International Conference on consumer Electronics, Jun. 8–10, 1988.

W. Press, S. Teukolsky, W. Vetterling and B. Flannery, Numerical Recipes in C—the Art of Scientific Computing at 123–128 (2nd ed. 1988).

SGS Thompson Catalog of Components for Multisync Monitors, Oct. 1993, pp. 1–30.

Display Laboratories, Inc., Minicam Automated Monitor Alignment & Inspection System, 1994.

Display Laboratories, Inc., DLAB43A, Advanced Information, 1995.

Display Laboratories, Inc., DLAB62A, Advanced Information, 1985.

Display Laboratories, Inc., DLAB494, Advanced Information, 1995.

Display Laboratories, Inc. DLAB520A, Advanced Information, 1995.

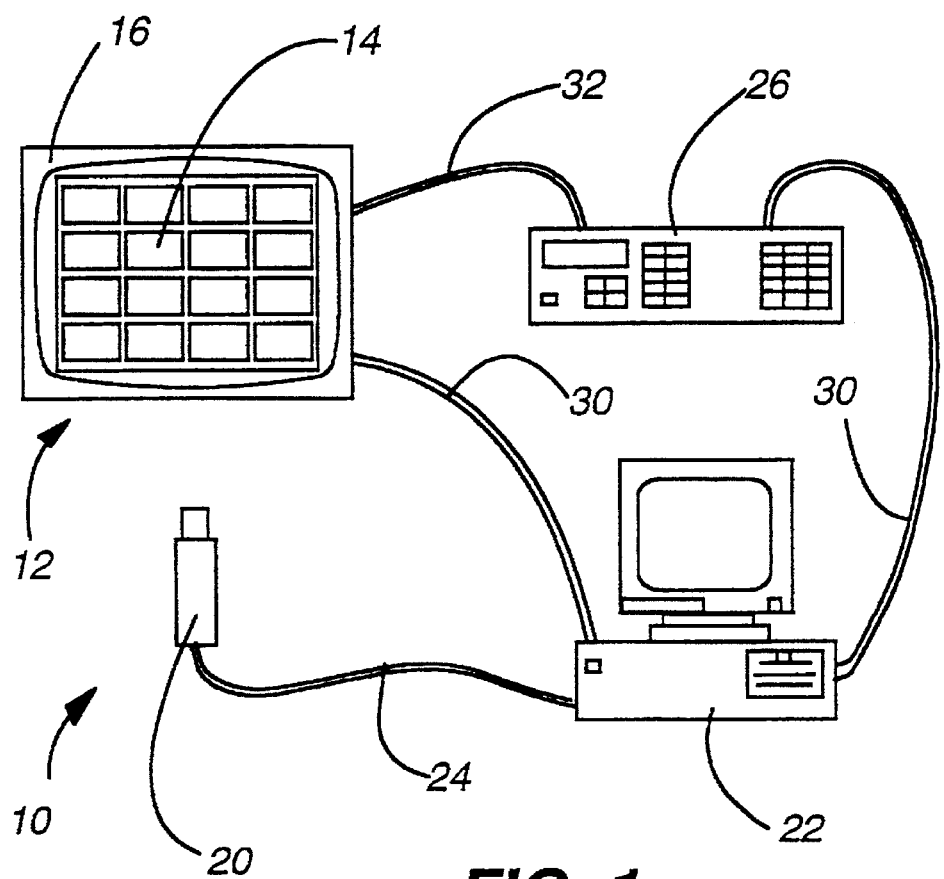
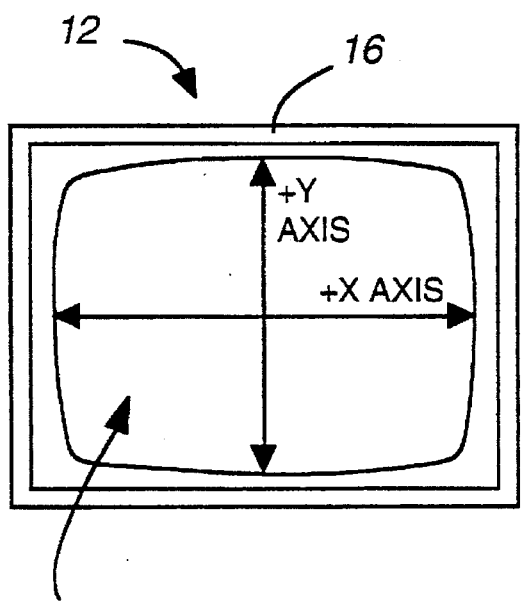
FIG. 2A
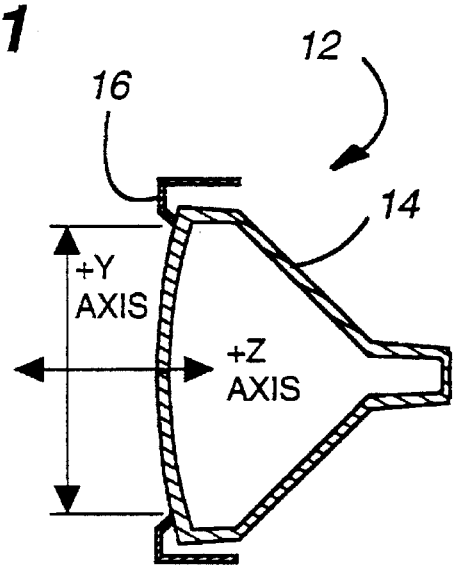
FIG. 2B

CORRECTION FOR MONITOR REFRACTION USING EMPIRICALLY DERIVED DATA

CROSS-REFERENCE TO RELATED APPLICATIONS

This application is a Continuation-In-Part of U.S. patent application Ser. No. 08/258,695 filed Jun. 13, 1994 now U.S. Pat. No. 5,510,833 issued Apr. 23, 1996 by James R. Webb, et al., entitled "Method and Apparatus for Transforming Coordinate Systems in an Automated Video Monitor Alignment System."

BACKGROUND OF THE INVENTION a. Field of Invention

This invention relates generally to video monitors and automatic alignment systems for video monitors, particularly automatic alignment systems including a camera for capturing an image of a displayed image on the monitor and accurately computing physical characteristics of the displayed image relative to the monitor by transforming coordinate systems.

b. Description of the Background

During assembly of video monitors, it is necessary to adjust certain parameters of the video monitor to achieve desired displayed characteristics in the displayed image of the monitor. Traditionally, video monitors have been adjusted by skilled operators in the factory prior to shipment to the customer. Manual adjustment of the monitor, however, is fraught with several problems. First of all, manual adjustment has meant manual measurement of physical characteristics of the displayed image, often with a tape measure. Consequently, the accuracy of the measurement and adjustment is greatly dependent upon the skill of the operator. In addition, operator fatigue plays a role in inaccurate adjustments. Third, consistent, objective and repeatable adjustments are unlikely with the manual system.

Another method for measurement of the physical characteristics of the displayed image uses optics and/or a light sensor mounted on an x-y positioning platform. This method can be very accurate but requires precise alignment of the measuring system to the CRT display. This method is also very slow and not applicable for production or manufacturing facilities for monitors where speed of adjustment is a driving factor.

U.S. Pat. No. 5,216,504, issued to the assignee of the present application, discloses an "Automatic Precision Video Monitor Alignment System" and is specifically incorporated herein by reference for all that it discloses and teaches. This system involves a single camera placed in front of a video monitor to capture a displayed image which is then supplied to a video board of a computer for analysis of the physical characteristics of the displayed image. The camera also captures an image of the display bezel which limits the outer boundary of the light-emitting area on the CRT. The bezel may be in the form of a shadow mask, an aperture grill, a display bezel or faceplate, or the like. The four inner corners of the bezel are ascertained and a two-dimensional, interpolative correction is made for camera/monitor misalignment. However, such an approach is limited in its accuracy and angular independence. This is mostly due to the use of a two-dimensional approach to compensate for a three-dimensional geometry of the CRT. Further, there are refraction errors due to the curvature and glass thickness of the CRT. Typically, the monitor manufacturer provides information pertaining to both the thickness and curvature of the glass that comprises the front face of the cathode ray tube monitor so that corrections can be made for refraction. However, it has been found that in many instances this information is not completely correct, or may change slightly over a period of time as changes are made by the manufacturer over a period of time. Even small changes in the amount, or shape, of curvature or thickness, can greatly affect the refraction produced by the front surface of the tube. In some cases, these specifications are not even available from the manufacturer. Moreover, calculation of incident angles for different curvatures can be difficult and subject to error. For these reasons, it is desirable to provide a system that can determine refractive errors for various positions on a cathode ray tube monitor in a simple and easy fashion that can be derived by empirical techniques.

It is against this background and the desire to improve on the prior art techniques that the present invention has been developed.

SUMMARY OF THE INVENTION

The present invention overcomes the disadvantages and limitations of the prior art by providing, in general, a method of determining X and Y slope values for correcting refraction errors in a cathode ray tube monitor comprising the steps of, determining a difference between X coordinate locations and Y coordinate locations of test points generated on the cathode ray tube monitor at first and second tilt angles, determining X and Y slope values of the test points by dividing the difference between the X coordinate locations of the test points by a difference between X component values of the test points for the first and second tilt angles, and by dividing the difference between the Y coordinate locations of the test points by a difference between Y component values of the test points for the first and second tilt angles.

In accordance with the purposes of the present invention, as embodied and broadly described herein, the present invention may also comprise an apparatus that generates correction factor signals for correcting refraction errors produced in a cathode ray tube monitor comprising, a signal generator that generates test points on the cathode ray tube monitor, a camera aligned with the cathode ray tube monitor at first and second tilt angles that generates a video signal indicating X and Y coordinate locations of the test points on the cathode ray tube monitor, a storage device that stores the X and Y coordinate locations of the test points for the first and second tilt angles, a processor that generates: X and Y coordinate location difference signals that are representative of a difference between X coordinate locations of the test points at the first and second tilt angles, and a difference between X coordinate locations of the test points at the first and second tilt angles; tilt angle component difference signals that are representative of a difference between X component values of the first and second tilt angles, and Y component values of the first and second tilt angles; and, X and Y slope signals that are representative of the X and Y coordinate location difference signals divided by the tilt angle component difference signals.

The advantages of the present invention are that it is capable of empirically determining correction factors for a cathode ray tube monitor to correct for refraction errors. The empirical data is not dependent upon any specifications that are provided by the manufacturer and allow for a high degree of accuracy of correction for specific locations on the monitor screen. Also, interpolated values can be generated for a video display that does not align with the predetermined X and Y coordinate locations. By interpolating slope coordinate values between slope coordinate locations, slope values for generating correction signals can be produced with a high degree of accuracy.

The empirically derived data has a high degree of accuracy and can be specifically derived for any particular model of monitor. Additionally, the empirical data can be updated on a regular basis to account for changes in manufacturing processes and designs. Slope values at particular slope coordinate locations comprise a relatively small amount of data for storage and allows for quick and easy generation of correction signals to account for refraction errors during an alignment process. Empirical data can be derived for several monitors of the same model and the empirical data can then be averaged so as to produce even more reliable data.

Other aspects, features and details of the present invention can be more completely understood by reference to the following detailed description of the preferred embodiment, taken in conjunction with the drawings, and from the appended claims.

DETAILED DESCRIPTION OF THE DRAWINGS

FIG. 1 is a block diagram of the system of the present invention for transforming coordinate systems in an automated video monitor alignment system.

FIG. 2A is a front view and FIG. 2B is a cross-sectional view of the video monitor of FIG. 1, defining coordinate systems therefor.

DESCRIPTION OF THE PREFERRED EMBODIMENT

Figure 3:
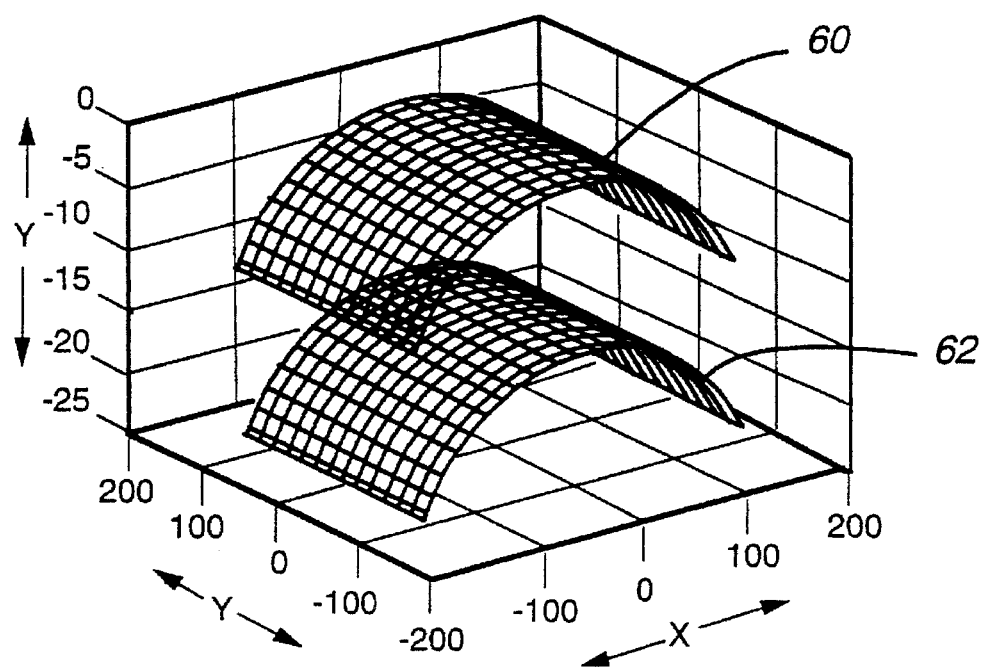
FIG. 3 is a graphical illustration of the relative position and shape of the surface of a particular cathode ray tube as an example and the location of the phosphor in the cathode ray tube in the video monitor of FIG. 1.

FIG. 1 discloses a single camera system 10 for transforming coordinate systems in an automated video monitor alignment system. As shown in FIG. 1, the system 10 includes a video monitor 12 which itself includes a cathode ray tube 14 (CRT) and its associated bezel 16, which may be an aperture grill, a shadow mask, a display bezel or faceplate, or the like, as discussed above. A solid-state camera 20 is placed in front of the monitor 12 to capture an image of the displayed image. The camera is connected to a conventional video board (not shown) in a modified personal computer 22 where a video signal 24 from the camera is processed in a conventional manner into a format suitable for processing by the computer. The computer communicates with the video monitor and with a video signal generator 26 through RS-232 ports 30. The video signal generator supplies a color video signal 32 to the video monitor. The computer may receive a configuration signal from the monitor which informs the computer of the size of the monitor, thickness of the glass of the CRT, shape and relative position of the glass and phosphor within the CRT and other pertinent data. Alternatively, the computer may receive this information about the monitor configuration from another source, such as a disk.

It is important to minimize the need for precise camera/video monitor fixturing and to present results in 'flat plane' units of measure. In order to solve both of these problems, the system of the present invention applies several mathematical models when measurements are made. These include models of the tube surfaces, phosphor and faceplate, the plastic bezel shape, and formulas to convert from coordinates in camera pixels to 'flat plane' units.

The general method of using some part of the monitor (e.g. bezel, be it a shadow mask, a faceplate or an aperture grill) as reference for measurement is disclosed in U.S. Pat. No. 5,216,504, issued to the assignee of the present invention, which is incorporated herein by reference.

This application describes one of the tube models and the formulas needed to convert from camera pixel to 'flat plane' coordinates. This modelling is needed when inspecting the geometry of a pattern displayed on a CRT. Edge measurements of a particular pattern are made in camera pixel coordinates. The camera pixel coordinates are then transformed to a 'flat plane' frame of reference in millimeters. This transformation takes into account the effect of the camera's perspective, and eliminates the effects of parallax.

The system 10 is able to compute the relative orientation of the camera 20 to the CRT 14 by measuring a system reference, such as a shadow mask (not shown), an aperture grill (not shown), or a display bezel 16. The optimum viewpoint is computed by iteratively transforming the measured reference data from camera pixel to 'flat plane' coordinates and comparing against known dimensions of the reference. The dimensions of the reference are obtained through the RS-232 communication link 30 with the monitor or from previously stored data such as on computer disk as discussed above.

In this way, the system 10 does not rely on precise fixturing since the viewpoint is computed each time a CRT is placed in front of the camera 20 for testing. Low tolerance fixturing may still be desired to ensure placement within the field of view of the camera or to eliminate vibration of a conveyor belt.

DEFINITIONS

In order for the results to be meaningful, some definitions must first be presented.
Coordinate System The 3D and 'flat plane' coordinates are shown on the CRT display in FIGS. 2A and 2B. The coordinate system is cartesian (x,y,z). The origin (0,0,0) is located on the front surface of the CRT where the axis of the CRT passes through the faceplate. The X axis passes horizontally across the front of the CRT, the Y axis passes vertically across the front of the CRT and the Z axis passes horizontally out of the CRT.
Notation Vectors are indicated in bold, scaler quantities are not. For example, the camera position is indicated by vc=(vc$_x$,vc$_y$,vc$_z$). Vector cross products are denoted by x and dot products by •.
Camera Pixel Coordinates Camera Pixel coordinates are located on the image plane of the camera sensor array. They will typically range from −320<=cp$_x$<=319, −240<=cp$_y$<=239 for a 640×480 array. The origin is where the camera lens optical axis passes through the sensor array.
Viewpoint The camera is considered to be located at a single point described by a vector from the origin, vc. The direction that the camera is pointing is described by a unit length vector, cpt. The horizontal pixel axis of the camera is described by a unit length vector, cx. Note that cx is perpendicular to cpt. The vertical pixel axis of the camera is described by a unit length vector, cy=cx×cpt. Only three vectors are needed to totally describe the relative orientation of the camera to display, vc, cpt, cx, which are computed as discussed above.

MODELS AND TRANSFORMATIONS

Tube Surface Models

A tube surface model is a description of the z coordinate of the phosphor or tube surface, as a function of (x,y). A surface may be described as having simple or compound radii in the x and y directions. A surface may also be described by an explicit formula where the parameters describe the shape of the surface. For brevity, only the explicit formula is shown, with parameters a$_{0..6}$.

$$\text{surface\_hgt}(p) = a_0 [p_x]^{a_1} + a_2 [p_y]^{a_3} + a_4 [p_x]^{a_5} [p_y]^{a_6}$$

Figure 4:
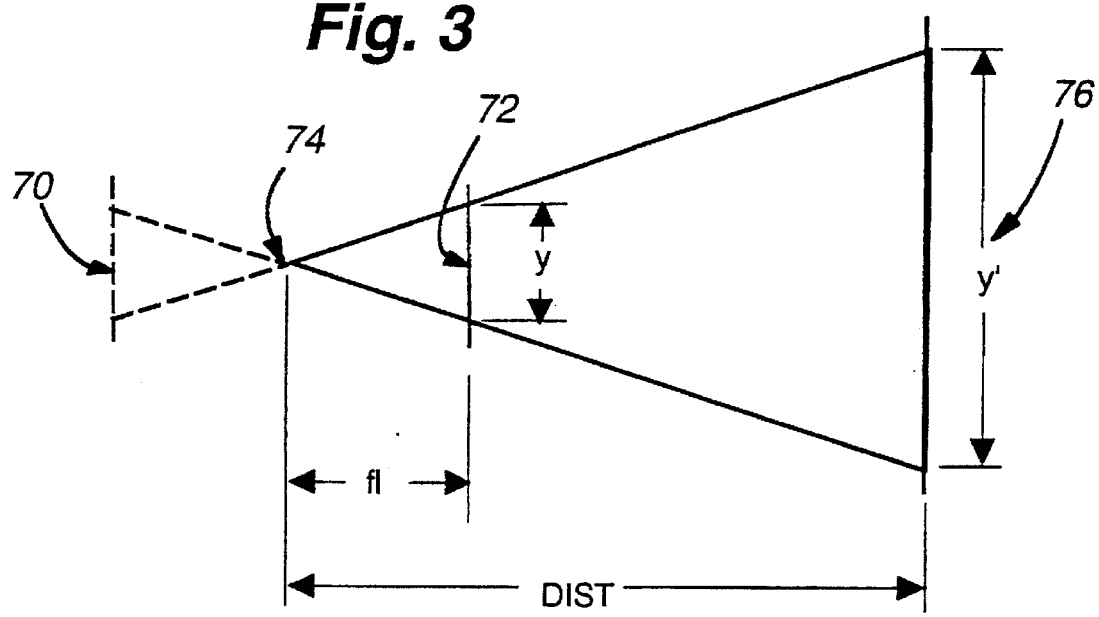
FIG. 4 is an illustration of the geometry involved in the transformation from camera pixels to target size by the system of FIG. 1.

FIG. 3 shows an example of the surface_hgt() 60 and phosphor_hgt() 62 of a simple radius 17" CRT. Other models and sizes will have different data. In this example, the surface radii are r$_x$=1,300 mm and r$_y$=40,000 mm.
Camera Pixel to 'Flat Plane' Transformation The transformation from camera pixel to 'flat plane' coordinates may be described by a set of vector equations. The solution of these equations may be done numerically. Portions may be solved in an iterative manner. But first, a simple example which demonstrates one of the important principles of the transformation is presented. FIG. 4 shows a simplified geometry of the transformation from camera pixels to target size, y', in millimeters. The lens focal length, f1, and distance to target, dist, are known.

In FIG. 4, the location of the actual image plane 70 is shown with dotted lines. In these transformations, a principle of similar triangles is used. Mathematically one says that the image plane 70 is located at the line indicated as the virtual image plane 72, which is an equal distance on the other side of the camera position 74. So to compute the distance y', which is the height 76 of some portion of the image, a simple relation holds, y'=y·dist/f1. The distance y may be the number of camera pixels between two image edges times the millimeter spacing per pixel on the sensor array.

So, for example, if one has a system where dist=600 mm, f1=16 mm, y=240 pixels·0.0135 mm/pix, then y'=121.5 mm. But if the distance is in error by 1 mm then the computed target size will be in error by 0.2 mm.

Figure 5:
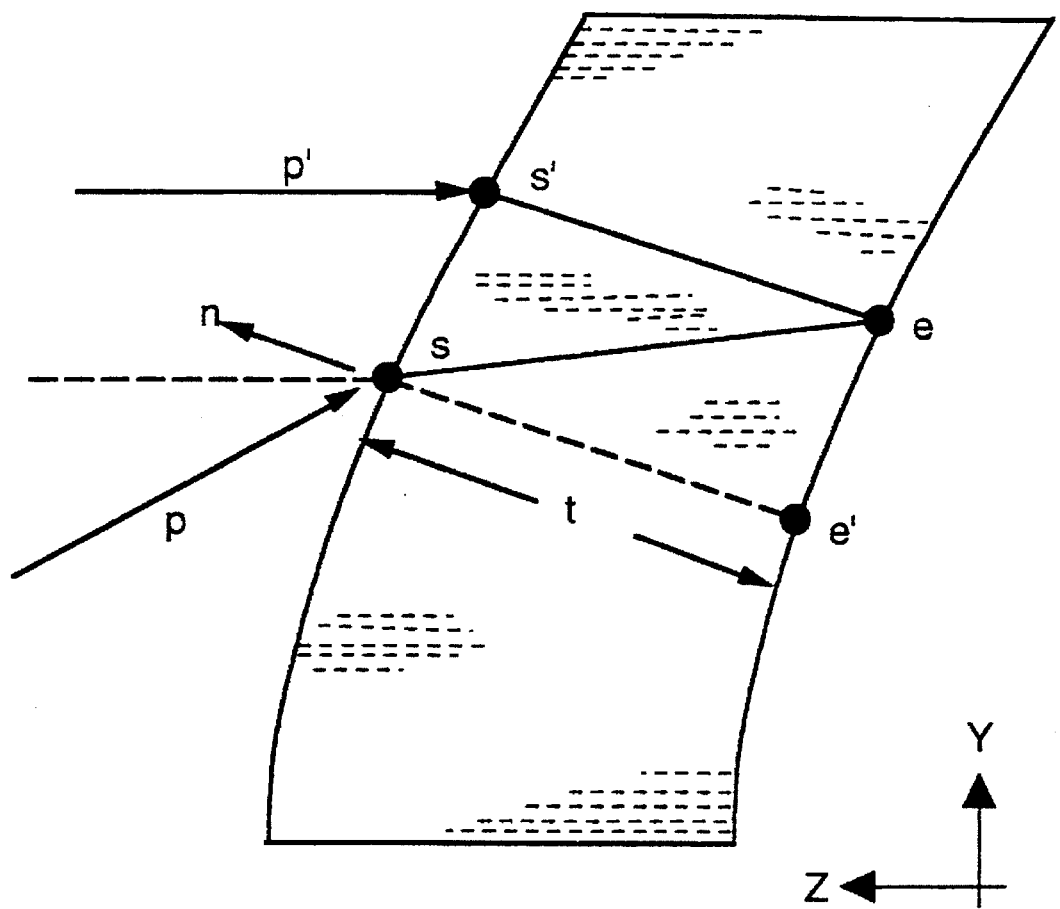
FIG. 5 is an enlarged cross-sectional view of a portion of the cathode ray tube of the video monitor in FIG. 1, showing the tracing of a ray of light through the tube's faceplate to illustrate the parallax between a view from an infinite distance and a view from the camera position.

FIG. 5 shows the ray traces through the tube's faceplate. This shows the parallax between a view from infinity and from the camera position. Since the actual geometry of measuring a CRT involves objects in three dimensions, vector equations must be used. Here are a few more definitions.

(cpx, cpy) camera pixel coordinates to be transformed to 'flat plane' coordinates.

mmp$_x$,mmp$_y$ millimeters per pixel, spacing between camera pixels in sensor array.

f1 focal length of the lens in millimeters.

n unit vector normal to tube surface at point s, points out.

The transformation begins by finding a vector p pointing from the camera position vc towards the feature being measured. This vector p is pointed along what is called the camera viewing ray.

$$p = f1 \cdot cpt + mmp_x \cdot cp_x \cdot cx + mmp_y \cdot cp_y \cdot cy$$

Find the point s on the surface of the tube where the viewing ray passes through. The last two of these equations are resolved iteratively.

$$s_z = 0$$

$$s = vc - p \cdot (vc_z - s_z)/p_z$$

$$s_z = \text{surface\_hgt}(s)$$

Compute a vector which is normal to the surface of the tube at the point s. This is a unit length vector.

$$n = \text{normal\_vect}(s)$$

Find the thickness t of the glass at point s, parallel to n. Thickness t is the distance from s to e'.

$$t = n_z \cdot (\text{surface\_hgt}(s) - \text{phosphor\_hgt}(s))$$

Trace the ray to the point on the phosphor e that generated the feature. Take into account the index of refraction of the tube glass, n$_g$. Make p1 a unit length vector in the direction of p.

$$p1 = p/|p|$$

Note that the magnitude of the cross product of $|p1 \times n| = \sin \theta$, where $\theta$ is the angle of incidence of the viewing ray $p$ to the glass surface. Recall that the index of refraction formula may be written as $n_1 \sin \theta_2 = n_2 \sin \theta_1$. The next three equations take into account the effect of index of refraction. The result is a unit length vector $p3$ pointing from $s$ to $e$.

$$p2 = -(p1 \times n) \times n/n_g$$

$$p3 = p2 - n \cdot \text{sqrt}(1 - p2 \cdot p2)$$

Now compute $e$, the point on the phosphor where the video image is actually generated.

$$e = s - t \cdot p3/(p3 \cdot n)$$

In order to compute the amount of parallax due to glass thickness, postulate a viewpoint from infinity where the viewing vector $p'$ is parallel to the z axis. Compute a virtual point $e'$ on the phosphor, as if the camera were located at infinity, and the viewing ray still passed through s.

$$p' = (0, 0, -1.0)$$

$$p2' = -(p' \times n) \times n/n_g$$

$$p3' = p2' - n \cdot \text{sqrt}(1 - p2' \cdot p2')$$

$$e' = s - t \cdot p3'/(p3' \cdot n)$$

Find the view from infinity point $s'$ on the surface. This is an approximation, since we assume that in the region of $s$, the tube surface and phosphor are parallel, and glass thickness is constant.

$$s' = s + e - e'$$

The transformation from camera pixel coordinates ($cp_x, cp_y$) to 'flat plane' coordinates ($s'_x, s'_y$) is now complete.

$$(cp_x, cp_y) \Rightarrow (s'_x, s'_y)$$

The reverse transformation follows similar methods and may be derived from these formulas.

EXPERIMENTAL VERIFICATION

Figure 6:
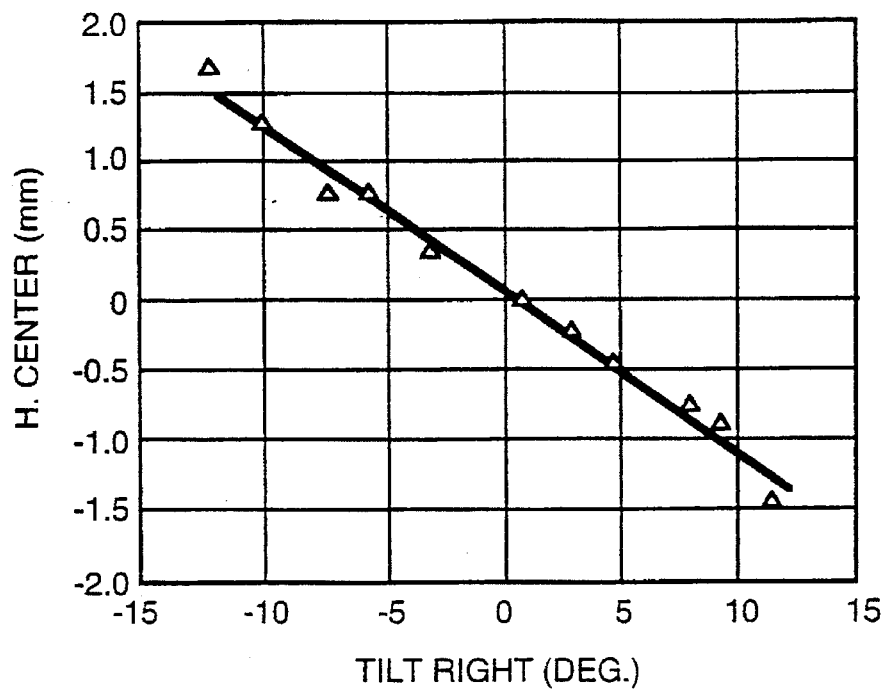
FIG. 6 is a graphical representation of an example of the error in horizontal center measurement versus camera monitor tilt angle when the system of FIG. 1 is not used.
Figure 7:
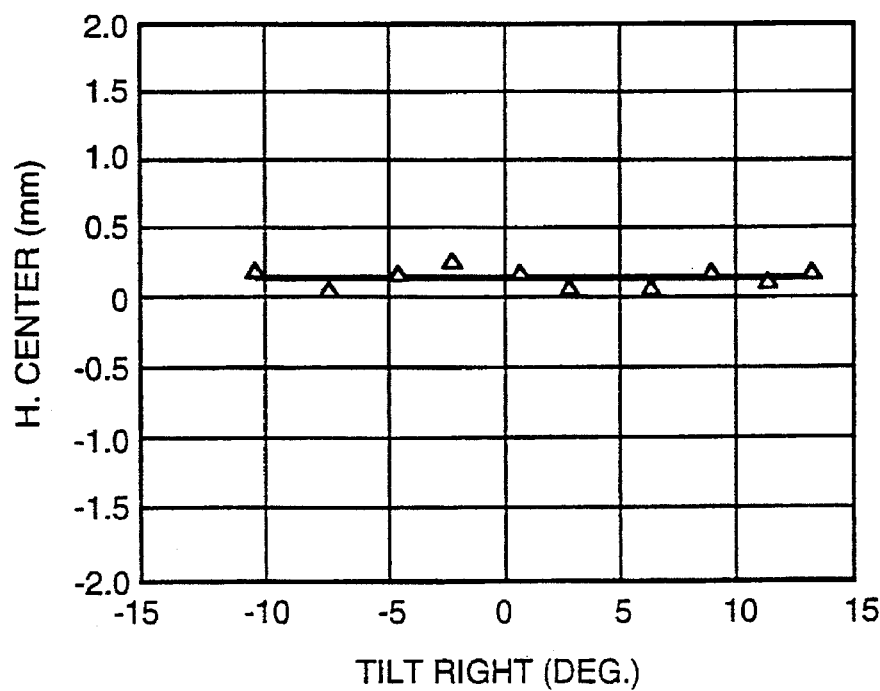
FIG. 7 is a graphical representation of an example of the error in horizontal center measurement versus camera monitor tilt angle when the system of FIG. 1 is used.

One example of the benefits of applying these models is demonstrated. The elimination of the effects of parallax is shown by measurements made on an exemplary 17" monitor. The horizontal center of a full white pattern is measured for a range of camera/monitor tilt angles. The monitor remained stationary, while the camera was placed in several positions from left to right. FIG. 6 shows how much the measured horizontal center changed as the camera/monitor orientation changed. This is due to parallax. The data for FIG. 6 was generated by effectively turning off the 3D modelling portion of the system of the present invention. FIG. 7 shows the measured horizontal center when the 3D models of the system are turned on, thus eliminating the effects of parallax.

ADVANTAGES

The ability to compute the viewpoint of the camera and transform edge locations from camera pixel to 'flat plane' coordinates yields multiple advantages in CRT inspection. Much less precise fixturing may be used in the placement of the CRT under test. For each display model, the inspection system change over is accomplished by loading in a new set of model parameters from disk, (e.g. surface_hgt(), phosphor_hgt(), mmp$_x$, mmp$_y$, f1 . . . ).

These transformations are necessary to allow a system of general design to correctly measure size, centering, and shape of video geometry of any CRT display. The effect of parallax is computed and removed so that the camera system may make accurate measurements from a wide range of positions.

Some of the motivation prompting this work has been to create a vision system of general design which may be applied to virtually any CRT based display. Only certain model parameters need be changed when setting up the system to inspect a particular CRT display.

Figure 8:
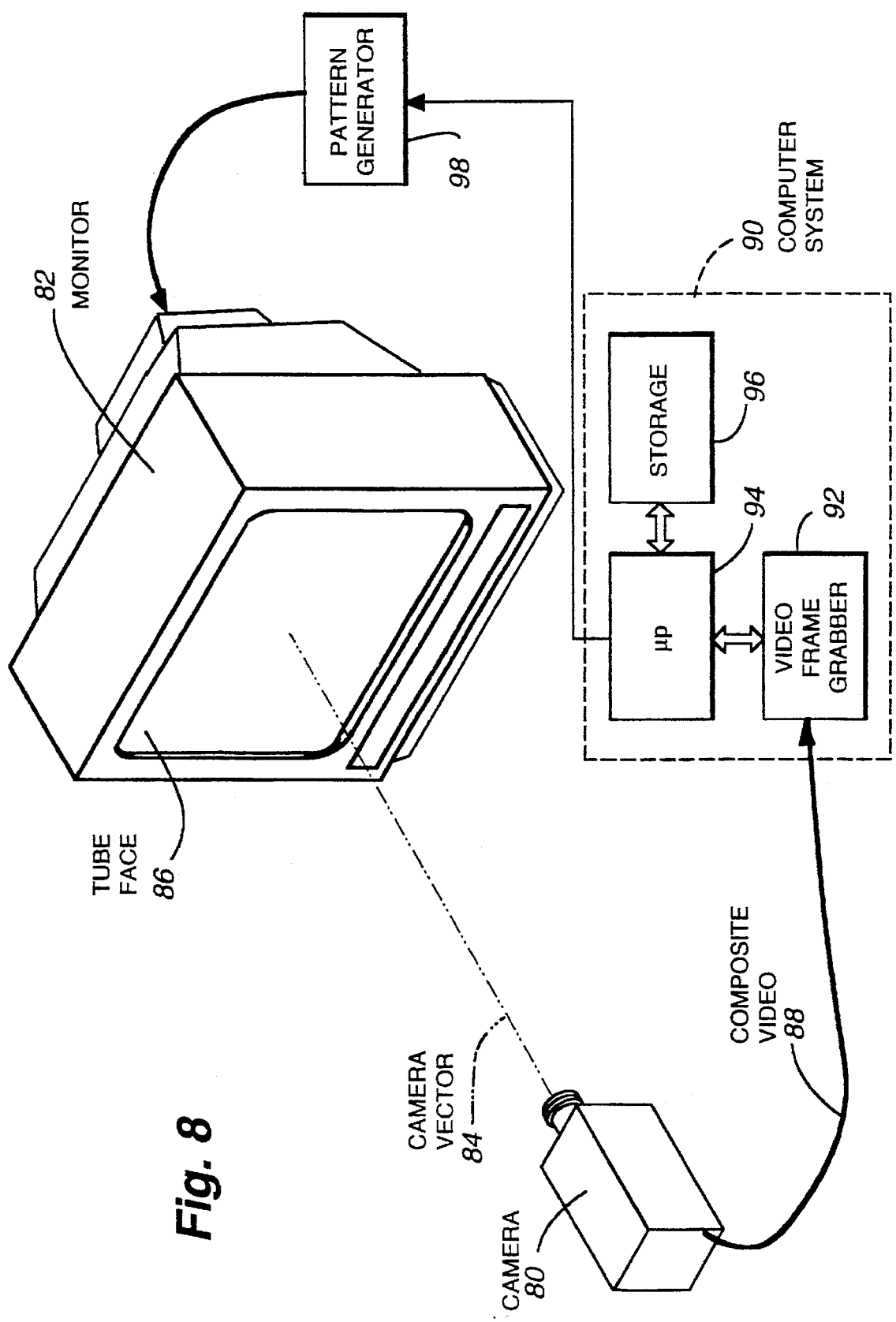
FIG. 8 is a schematic block diagram illustrating the various components of a vision system for aligning a monitor or, alternatively for use in deriving empirical data from a sample monitor to correct for refraction errors.
Figure 11:
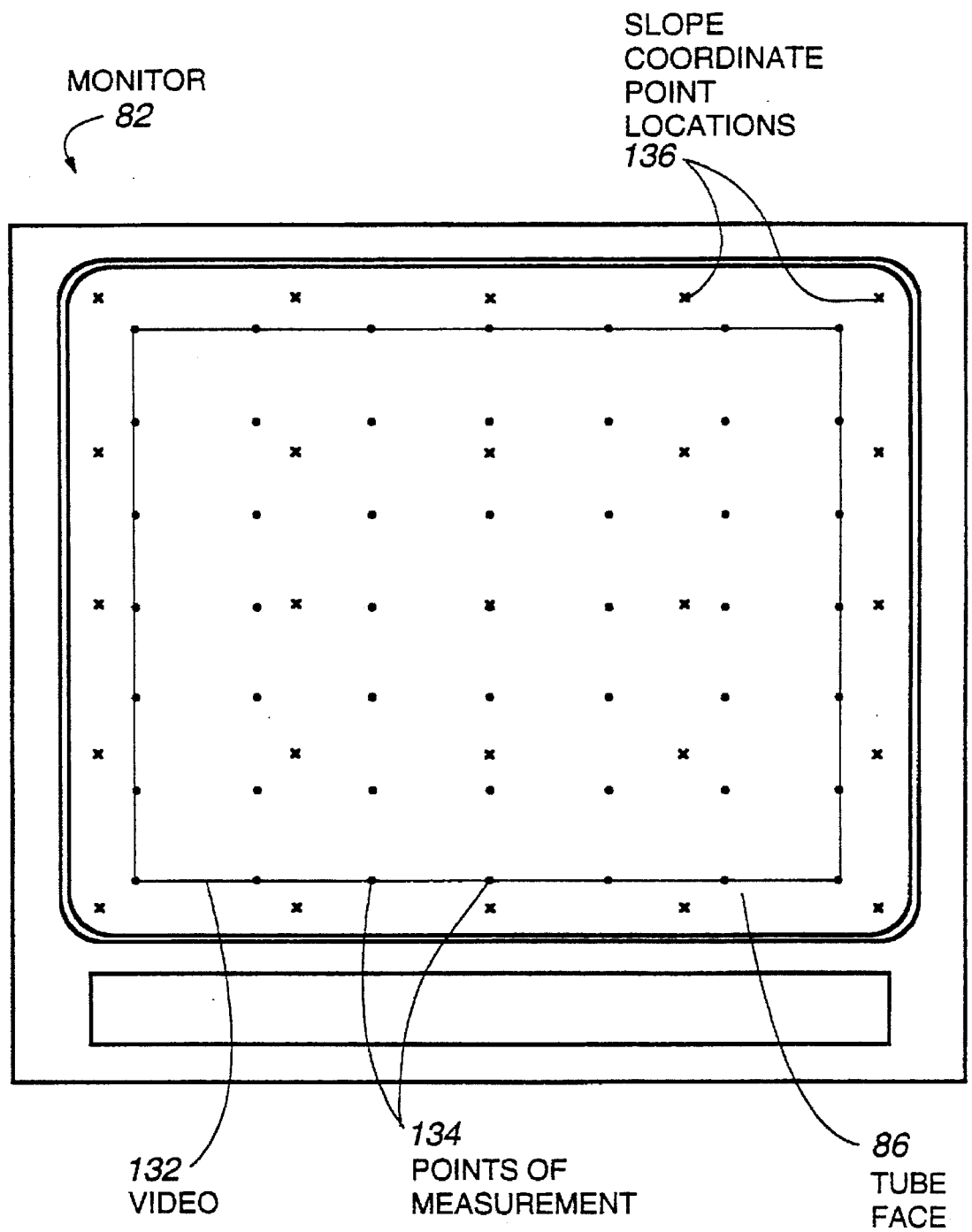
FIG. 11 is a schematic representation of a tube face of a sample monitor screen that has been transformed to flat plane coordinates to facilitate the derivation of empirical data.

FIG. 8 is a schematic block diagram illustrating the primary components of a vision system that can be used to either derive empirical data from one or more sample monitors relating to refraction errors, or align monitors by using such empirically derived data to generate error correction signals to correct for refraction errors. As shown in FIG. 8, a camera 80 is aligned with a monitor 82 such that a camera vector (cpt) 84 is aligned to pass through the center of the screen 86 of monitor 82. Monitor 82 can comprise a monitor that is being aligned on a production line or can comprise a sample monitor for which slope coordinate values are being generated. Camera 80 generates a composite video signal 88 that is applied to video frame grabber 92 of computer system 90. Microprocessor 94 is coupled to video frame grabber 92 and to storage device 96 within computer system 90. Microprocessor 94 also generates signals for controlling pattern generator 98. Pattern generator 98 generates a plurality of test points, as illustrated in FIG. 11, on the tube face 86 of monitor 82 in a system for generating slope coordinate points on a sample monitor, or alternatively, generates a plurality of points of measurement on screen 86 during an alignment process, as disclosed, in FIG. 12. In operation, video frame grabber 92 captures a video image of the screen 86 having a predetermined pattern generated by pattern generator 98. The microprocessor 94 performs various functions and controls storage device 96 to store various data parameters pertaining to the information captured by video frame grabber 92. The various processes performed by microprocessor 94 depend upon whether the system is being used for alignment of monitor 82 or determination of slope coordinate values on screen 86, as set forth below.

Figure 9:
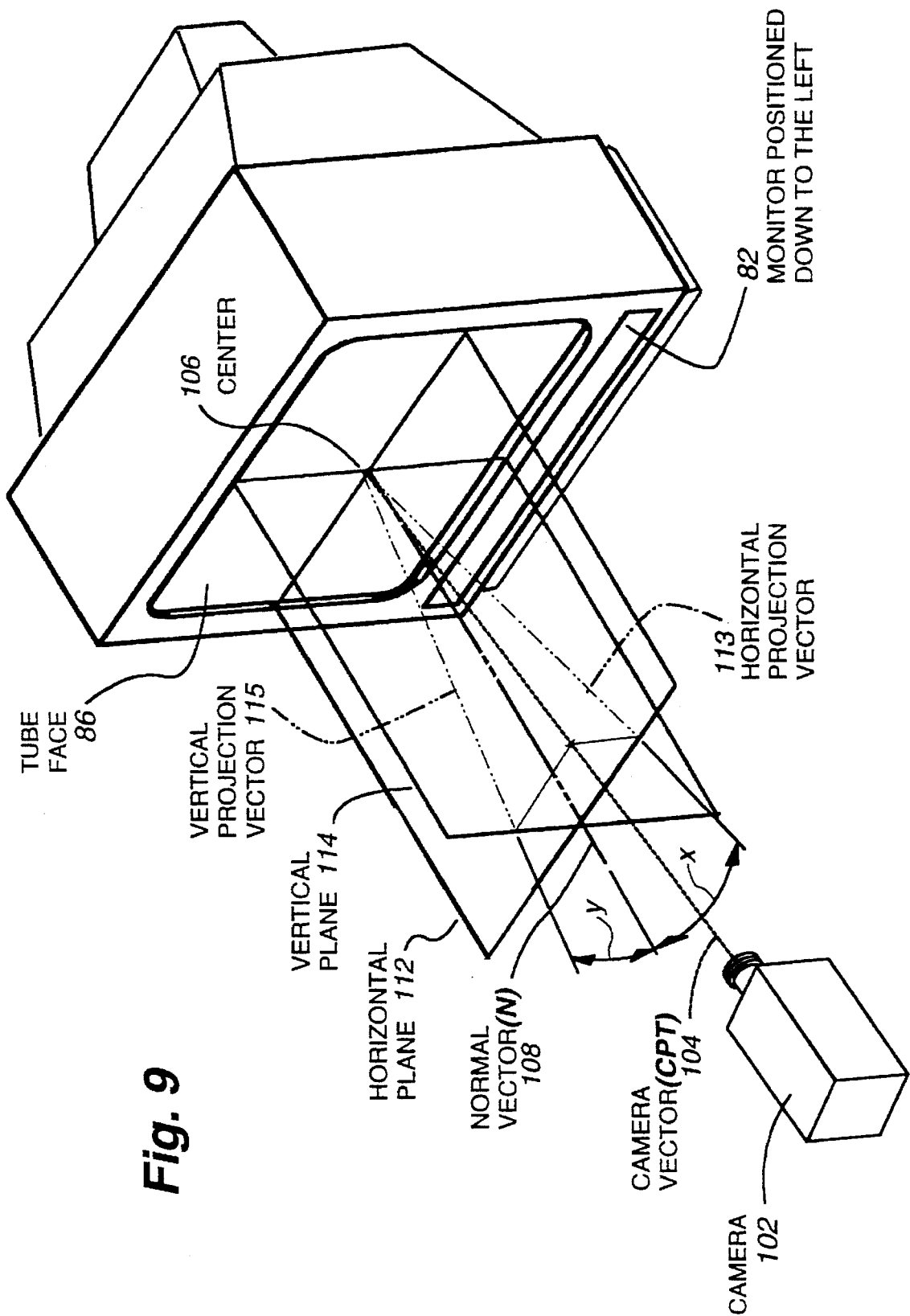
FIG. 9 is a schematic illustration of the manner in which a monitor can be placed at a first tilt angle relative to the vision system showing x and y components of the first tilt angle.

FIG. 9 is a schematic illustration of a monitor 82 that is positioned down and to the left with respect to camera 102. As shown, a camera vector (cpt) 104 that passes from camera 102 through the center of tube face 86 is offset from normal vector (N) 108 that is normal to, and passing through, the center of the tube face 86. The monitor 82 is positioned at a first tilt angle relative to the camera vector (cpt) 104 as indicated by the angle formed between normal vector 108 and camera vector 104. This is more clearly illustrated by referring to vertical plane 114 and horizontal plane 115 that pass through and intersect at normal vector 108. The camera vector 104 is projected onto the horizontal plane 112 to form horizontal projection vector 113. Similarly, the camera vector 104 is projected onto vertical plane 114 to form vertical projection vector 115. As shown, an X angle is formed in the horizontal plane 112 between normal vector 108 and horizontal projection vector 113. The X angle illustrates the X component value of the first tilt angle. Similarly, a Y angle is formed in the vertical plane 114 between normal vector 108 and vertical projection vector 115. The Y angle illustrates the Y component value of the first tilt angle. The X and Y component values of the first tilt angle illustrated in FIG. 9, taken together, comprise the total tilt angle of the normal vector 108 with respect to the camera vector 104. In this manner, the X and Y component values are capable of fully describing the tilt angle of the monitor 86 with respect to camera 102 of the vision system.

Figure 10:
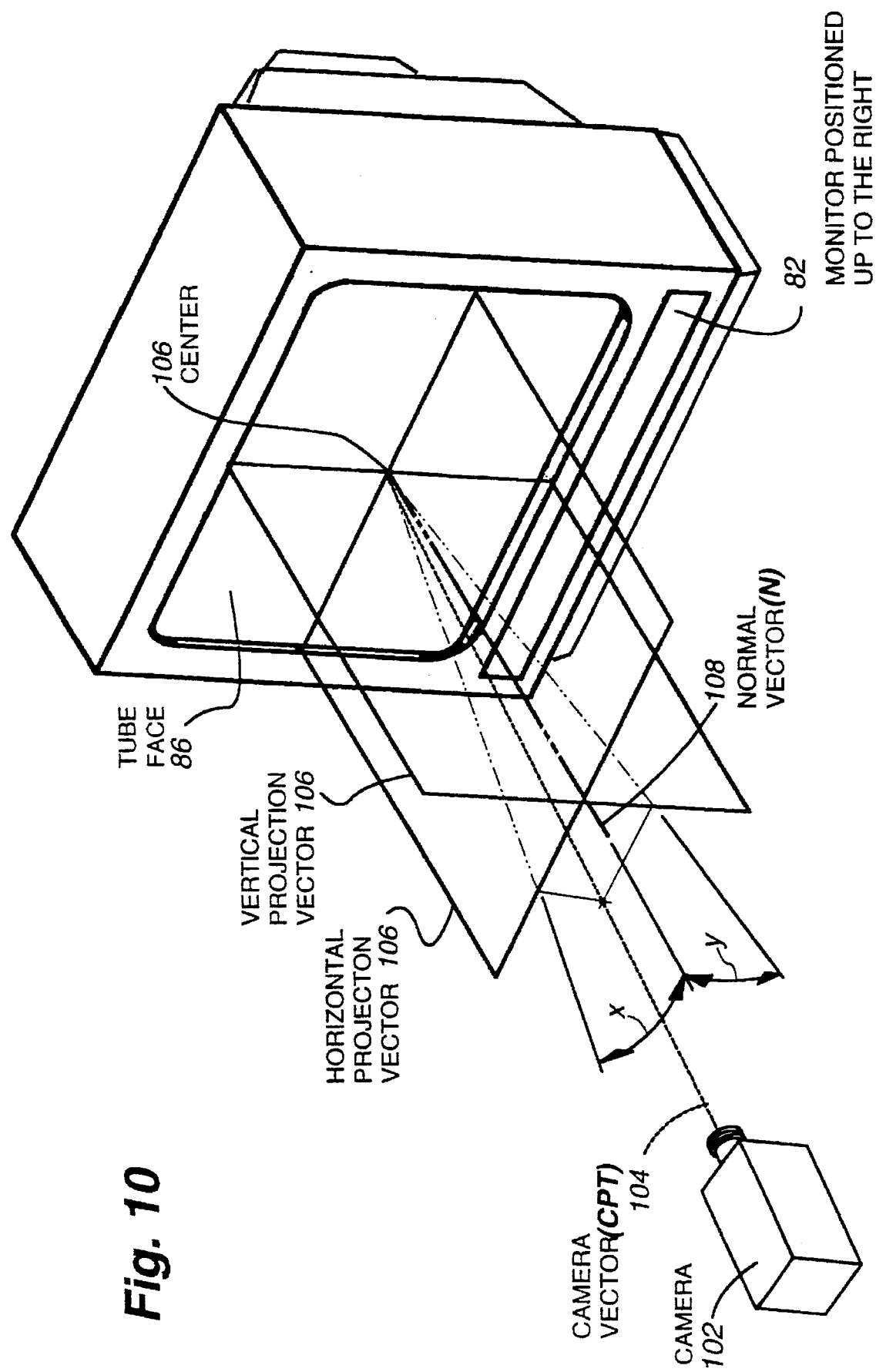
FIG. 10 is a schematic illustration of the manner in which a monitor can be placed at a second tilt angle relative to the vision system showing X and Y components of the second tilt angle.

Similarly, FIG. 10 illustrates camera vector 104 that passes from camera 102 through the center 106 of tube face 86. As shown, the monitor 82 is positioned up and to the right with respect to camera 104. As shown in FIG. 10, normal vector 108 is positioned at a second tilt angle with respect to camera vector 104 having both X and Y components. In a similar manner to that shown in FIG. 9, camera vector 104 is projected onto horizontal plane 112 to form horizontal projection vector 119, and onto the vertical plane 114 to form a vertical projection vector 117. The X angle formed in the horizontal plane 112 between horizontal projection vector 117 and normal vector 108 comprises the X component at the second tilt angle. Similarly, the Y angle formed in the vertical plane 114 between vertical projection vector 119 and normal vector 108 comprises the Y component at the second tilt angle. Again, the X and Y components fully describe the angular difference between camera vector 104 and normal vector 108 for a second predetermined tilt angle of monitor 82, as illustrated in FIG. 10. The vision system illustrated in FIG. 8 is capable of determining the X and Y component values of the angles that exist between the camera vector 104 and normal vector 108 in the manner described above using the techniques employed in the camera pixel to flat plane transformation.

FIG. 11 is a schematic illustration of monitor 82 showing slope coordinate points and test points on tube face 86 that have been transformed to flat plane coordinates. Monitor 82 has a monitor housing 116 that has an inside surface forming a bezel 118. Bezel 118 forms straight horizontal and vertical lines at the edge of the tube face 86 that define the usable portion of tube face 86. FIG. 11 illustrates a sample monitor 82 that is used to generate slope coordinate points 120 that have slope coordinate values indicating the amount of correction required due to refraction caused by tube face 86. Monitor 82 shows a series of slope coordinate points 120 that have been transformed to flat plane coordinates in the manner described above. However, the transformation to flat plane coordinates differs in that corrections for refraction errors are not employed in the transformation techniques since the present invention empirically determines refraction correction data. The slope coordinate points 120 are generated for display on monitor 82 by the pattern generator illustrated in FIG. 8. Sample monitor 82 has already been aligned such that the slope coordinate points 120 are positioned in an evenly spaced manner on tube face 86. Once the slope coordinate points 120 are properly located on the tube face 86, it is then necessary to determine the slope coordinate values at the slope coordinate locations of the slope coordinate points 120. The slope coordinate values are representative of the refraction errors at each slope coordinate location of slope coordinate points 120.

To determine the slope coordinate values of the slope coordinate points 120, as illustrated in FIG. 11, the sample monitor 82 can be placed in a first tilted position, such as illustrated in FIG. 9. Assuming that the first tilt angle causes the monitor to be positioned downwardly and to the left with respect to camera vector 104, such as illustrated in FIG. 9, slope coordinate point 122 may appear on tube face 86 in a location such as illustrated by test point 124. This change in the observed position of slope coordinate point 122 from the position shown in FIG. 11, to the location of test point 124, is a result of refraction of the glass of tube face 86. Of course, the phosphors of the monitor 82 are disposed on the inside surface of the tube face 86 and the image created by slope coordinate point 122 must pass through the glass of tube face 86 which has a certain thickness and curvature causing the image to appear at test point 124 at the first tilt angle.

In a similar manner, when the monitor 82 is positioned at a second tilt angle, such as illustrated in FIG. 10 where the monitor is positioned upwardly and to the right with respect to camera vector 104, the slope coordinate point 122 may appear in the location of test point 126. As can be seen in FIG. 11, the slope coordinate point 122 changes positions in both the X and Y directions when viewed by the vision system at the first and second tilt angles, as illustrated by test points 124 and 126. The difference between X coordinate locations 128 is the difference value in the X direction between test point 124 and test point 126 when the monitor is moved between a first and second tilt angle. Similarly, the difference between Y coordinate locations 130 illustrates the difference in the Y direction between test points 124 and 126 when the monitor 82 is moved from a first tilt angle to a second tilt angle.

To determine the slope coordinate values of the slope coordinate points 120 illustrated in FIG. 11, a mathematical procedure can be employed by microprocessor 94. Considering the X axis, the difference between X coordinate locations 128 is determined by microprocessor 94 through simple subtraction of the X locations of test points 124 and 126. This is determined by detecting the pixel column in which test point 124 and test point 126 appear. The vision system in FIG. 8 is also capable of determining the X component value of the first tilt angle as illustrated in FIG. 9 and the X component value of the second tilt angle as illustrated in FIG. 10. The difference between these X components for the two different tilt angles is also determined by microprocessor 94 and stored in storage device 96. Microprocessor 94 then divides the difference between X coordinate locations 128 by the difference between the X component values for the two different tilt angles to generate an X slope coordinate value for slope coordinate point 122. Again, the slope coordinate value for slope coordinate point 122 is indicative of the amount of refractive correction required at slope coordinate point 122. Once the slope coordinate value is determined for slope coordinate point 122, a correction signal can be generated during an alignment process, as disclosed below, by multiplying the slope coordinate value by the particular tilt angle of the monitor being aligned relative to the vision system.

Figure 12:
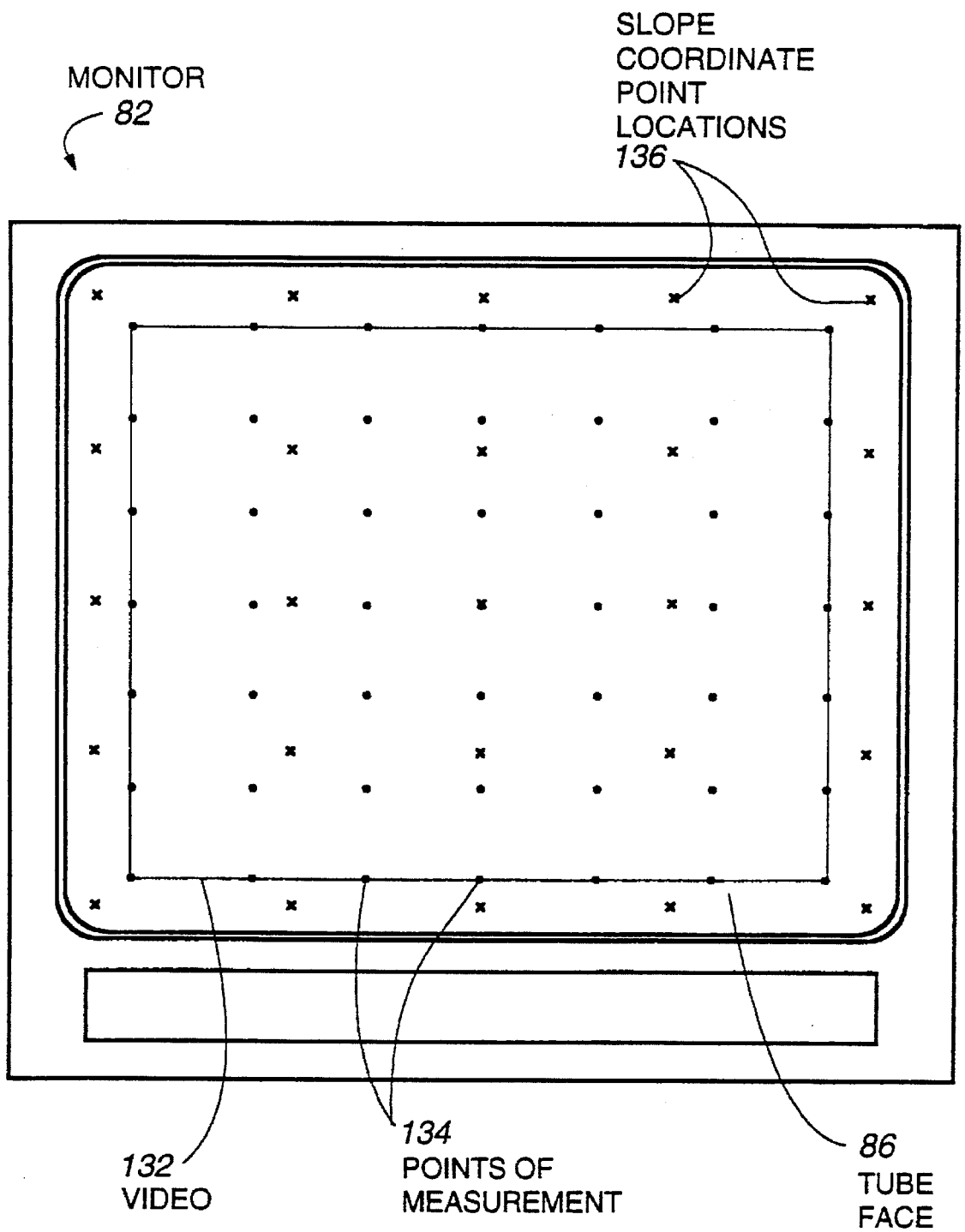
FIG. 12 is a schematic representation of a flat plane transformation of a tube face of a monitor being aligned.

FIG. 12 is a schematic diagram of a monitor 82 that is being aligned by a vision system, such as illustrated in FIG. 8. As shown in FIG. 12, a video signal 130 is generated by pattern generator 98 (FIG. 8) that includes a plurality of points of measurement 134. The points of measurement 134 are illustrated as dots on FIG. 12, but can comprise the intersection of horizontal and vertical lines generated by pattern generator 98 in the same manner as slope coordinate points 120 of FIG. 11. The location of the slope coordinate points 136 is stored in storage device 96, together with the slope coordinate values for each of the slope coordinate points 120. The slope coordinate points 120 form a grid of 25 points that cover the tube face 86. Similarly, points of measurement 134 form a grid of 49 points that are evenly distributed on tube face 86. Of course, any number of slope coordinate points or points of measurement can be employed in accordance with the present invention. As shown in FIG. 12, the video display 132, containing the points of measurement 134, is disposed inwardly from the slope coordinate point locations 136. Again, the vision system of FIG. 8 has performed a flat plane transformation without correcting for refraction to generate the data illustrated on FIG. 12 which may be stored in storage device 96. Once the image has been transformed to a flat plane, a slope coordinate value can be generated for each of the points of measurement 134 through a process of interpolation. For example, the techniques disclosed in "Interpolation in Two or More Dimensions," Section 3.6, *Numerical Recipes in C, the Art of Scientific Computing*, Second Edition by William H. Press, Saul A. Teukolsky, William T. Vetterling and Brian P. Flannery, Cambridge University Press, 1995, can be used to generate the slope values for the points of measurement 134 using either linear or higher order techniques. In this manner, specific slope coordinate values can be generated for each of the points of measurement 134 illustrated in FIG. 12.

Figure 13:
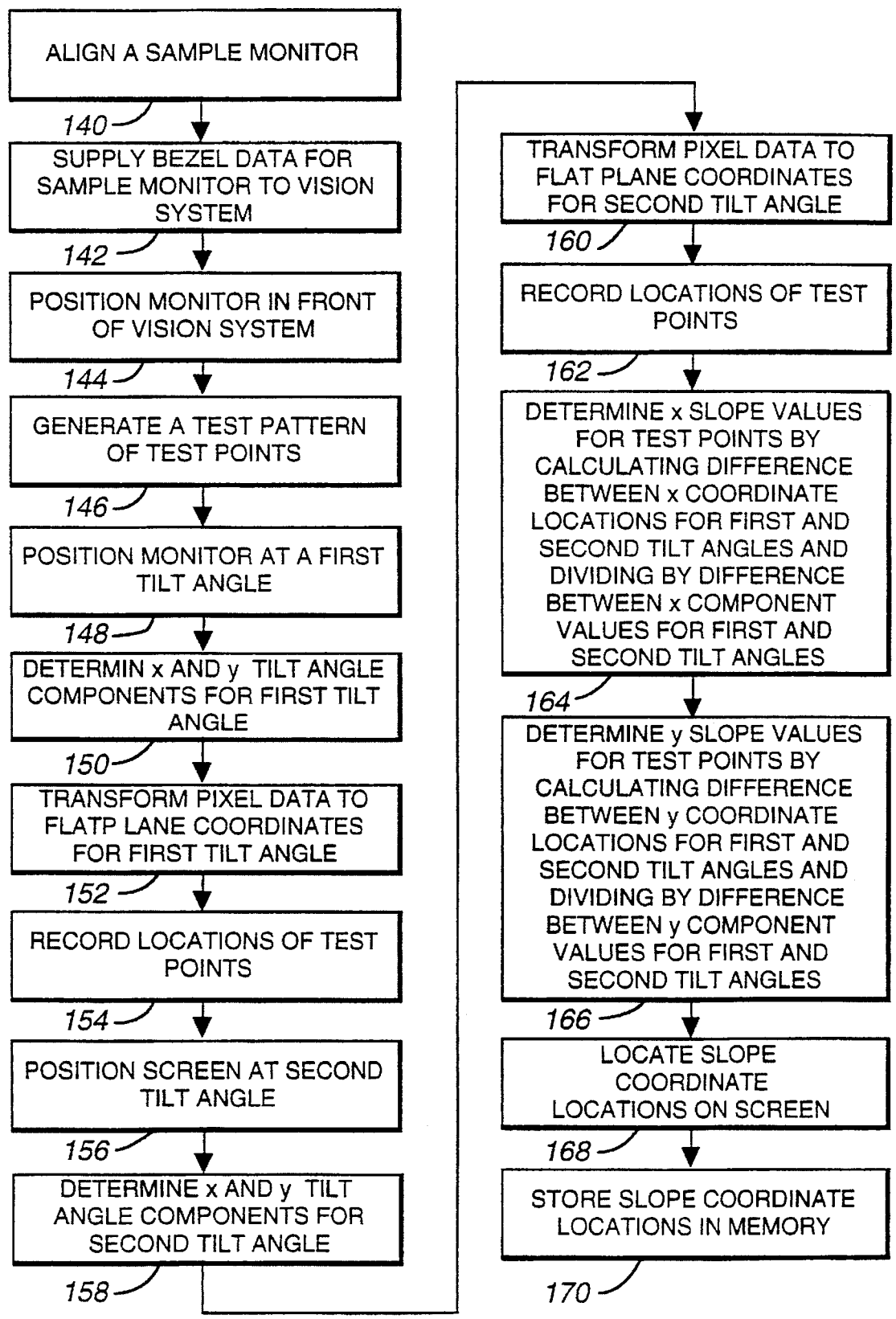
FIG. 13 is a schematic flow diagram illustrating the processes that are performed by the present invention to generate X and Y slope values and locate slope coordinates on the tube face for a sample monitor.

FIG. 13 is a schematic flow diagram illustrating the manner in which slope coordinate values can be generated for a sample monitor using a vision system such as illustrated in FIG. 8. As disclosed above, a sample monitor for a particular type of monitor is aligned either manually or using an automatic vision system at step 140. At step 142, bezel data for the sample monitor is supplied to the vision system that indicates the size of the tube face 86 and the location of the bezels with regard to the tube face. At step 144, the sample monitor 82 is positioned in front of the vision system such as illustrated in FIG. 8. At step 146, pattern generator 98 generates a test pattern of test points. At step 148, the monitor is positioned at a first tilt angle relative to the vision system, such as illustrated in FIG. 9.

The vision system then determines the X and Y tilt angle components in FIG. 13 for the first tilt angle at step 150, as described above with regard to FIG. 9. The vision system illustrated in FIG. 8 then transforms the pixel data to flat plane coordinates for the first tilt angle at step 152, as described above. The location of the test points, such as test point 124 (FIG. 11) is then stored in storage device 96. At step 156, the sample monitor 82 is then positioned at a second tilt angle, such as illustrated in FIG. 10. At step 158, the X and Y tilt angle components for the second tilt angle are determined by the vision system of FIG. 8, as illustrated in FIG. 10. The location of the test points is then recorded at step 162, such as test point 126. Computer system 90 then determines the X slope values for the test points at step 164 by calculating the difference between X coordinate locations of the test points for the first and second tilt angles and dividing by the difference between the X component values for the first and second tilt angles. In other words, the difference between X coordinate locations 128, as illustrated in FIG. 11, is divided by the difference between the two X component values, illustrated in FIGS. 9 and 10, to generate an X slope value for the test points. Similarly, the Y slope values for the test points are determined at step 166 by calculating the difference between Y coordinate locations for the first and second tilt angles and dividing by the difference between the Y component values for the first and second tilt angles.

At step 168 of FIG. 13, the slope coordinate point locations 136 are located in memory as to their relative position on the tube face 86. This can be done in several different ways. For example, the sample monitor 82 can be aligned relatively squarely with the camera 102. Correction factor signals can be generated using the slope coordinate values and the X and Y component values for the relatively square orientation of the sample monitor. Alteratively, correction factor signals can be generated from the slope coordinate values and the X and Y component values of either the first or second tilt angles. Additionally, the location of the slope coordinate points can be determined by the expected coordinate locations of those points based upon an aligned monitor. Once the slope coordinate point locations are determined, they are stored in storage device 96 at step 170.

Figure 14:
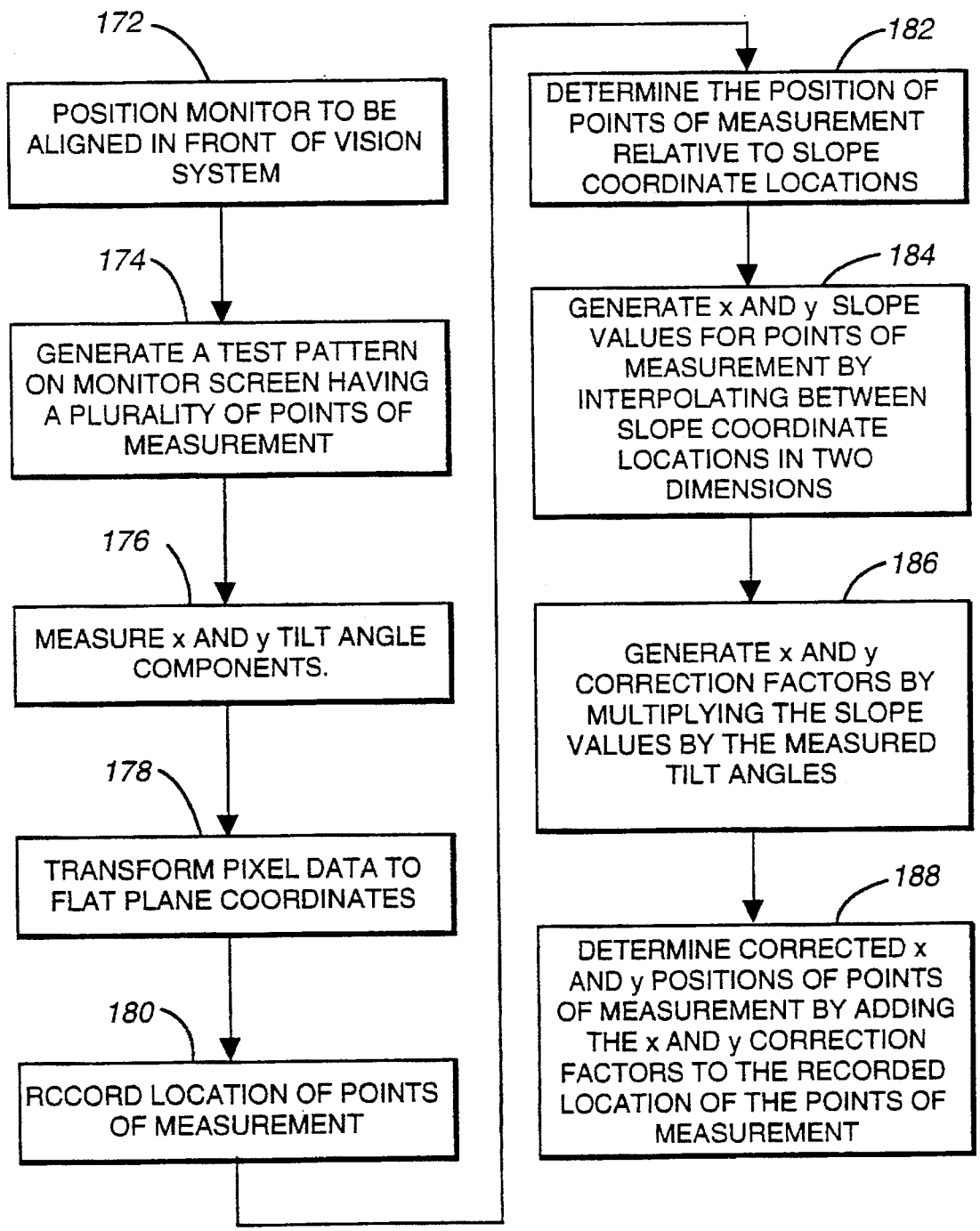
FIG. 14 is a schematic flow diagram illustrating the processes used in accordance with the present invention for generating X and Y correction factors to correct for refraction during the alignment process.

FIG. 14 is a flow diagram illustrating the manner in which correction factors for correcting refraction errors can be generated during the alignment process of a monitor. The flow diagram of FIG. 14 assumes that a series of slope coordinate values have been generated and stored in a vision system such as the vision system illustrated in FIG. 8, together with the slope coordinate point locations. A vision system, such as illustrated in FIG. 8 can also be used, as disclosed above, for aligning monitors in a production process. At step 172, a monitor is positioned for alignment in front of a vision system, such as illustrated in FIG. 8. In a production process, the monitor need not be aligned normal to the camera vector 84, but within preset limits, such as the limits of the X and Y components of the first and second tilt angles as described above with regard to FIGS. 9 and 10. Typically, these limits may be plus and minus five degrees in the X and Y direction. Such limits of the tilt angle are sufficiently loose to allow monitors to be placed on a production line without the necessity of employing positioning techniques.

At step 174, as illustrated in FIG. 14, the pattern generator 98 generates a test pattern on the monitor screen that produces a plurality of points of measurement 134, as illustrated in FIG. 12. At step 176 of FIG. 14, the X and Y tilt angle components of the monitor relative to the camera vector 84 are measured by computer system 90 (FIG. 8). At step 178, computer system 90 transfers the pixel data to flat plane coordinates, as described above, without making corrections for refraction. At step 180, computer system 90 stores the location of the points of measurement that have been transformed to the flat plane coordinates. At step 182 the computer system 90 determines the position of the points of measurement relative to the slope coordinate locations. At step 184 computer system 90 generates X and Y slope values for the points of measurement by interpolating between slope coordinate locations in two dimensions, such as described in the above-referenced text. X and Y correction factor signals can then be generated at step 186 by multiplying the slope values by the measured tilt angle of the monitor to the camera vector 84. The measured tilt angle is the angle at which the monitor in the production line is tilted with regard to the vision system as identified by the camera vector 84. At step 188, the corrected X and Y positions of the points of measurement are determined by adding the X and Y correction factors that have been calculated by the computer system 90 to the recorded location of the points of measurement. In this manner, the corrected position of the points of measurement are then stored in storage device 96 so that alignment of the monitor can proceed using the vision system and the corrected locations of the points of measurement.

Figure 15:
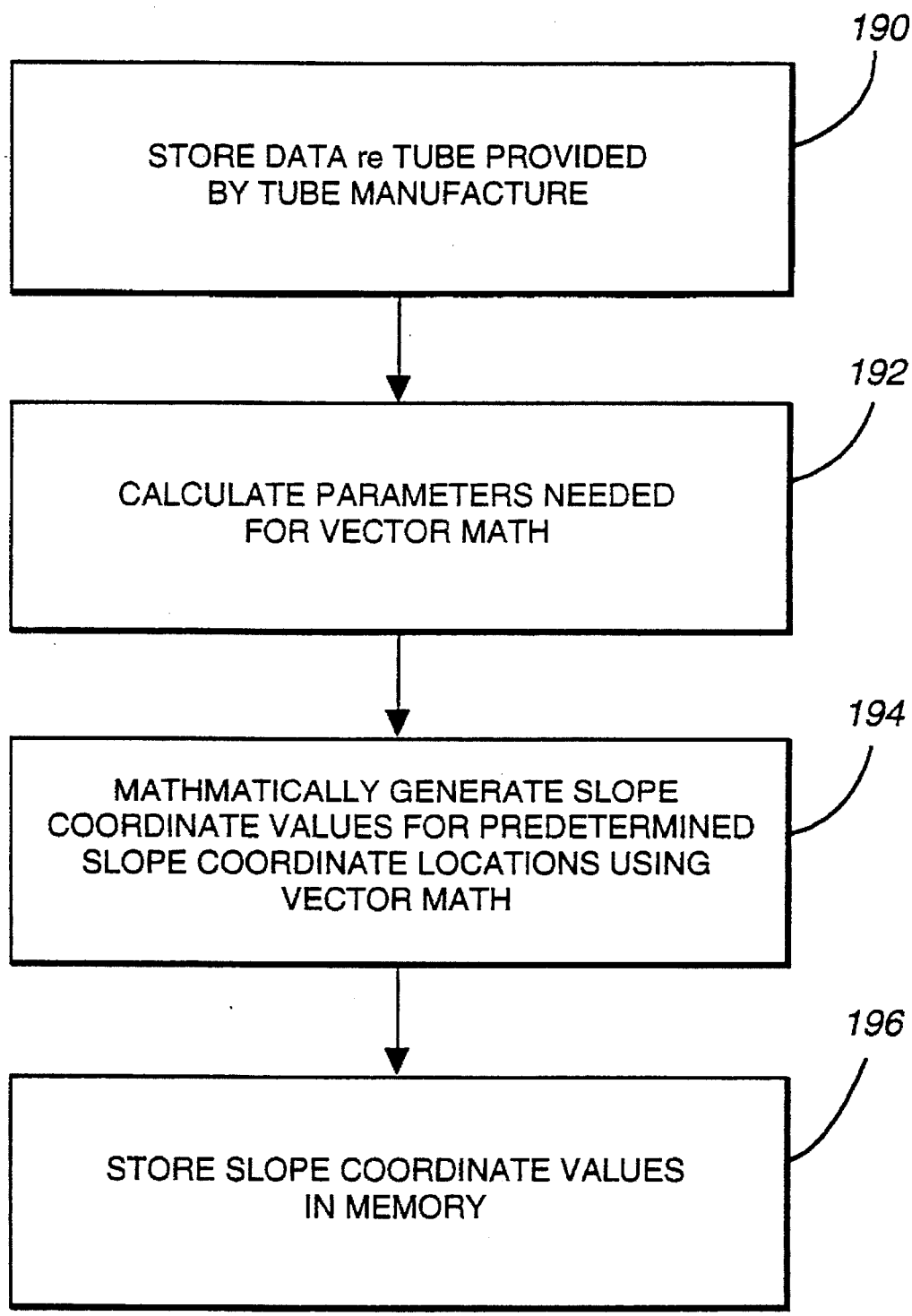
FIG. 15 is a schematic flow diagram illustrating the memories used in the present invention for storing the manufactured tube data and calculated slope coordinate values.

FIG. 15 is a schematic flow diagram of an alternative embodiment of the present invention. FIG. 15 illustrates the manner in which slope coordinate values can be generated mathematically using the vector math disclosed above. As shown at Step 190, the vision system illustrated in FIG. 8 is directed to store data in storage device 96 (FIG. 8) that is provided by the tube manufacturer. This data provides specifications regarding the structure and configuration of the tube. This information can be provided in various forms. For example, a tube manufacturer may provide the radius of curvature for different portions of the tube face 86 or may provide the distances of the outer surface of the tube and the inner surface of the tube from a predetermined location in the tube. The tube manufacturer may also provide specifications regarding the thickness of the tube face 86 at different locations on the tube. The index of refraction of the glass that forms the tube face 86 is also provided by many manufacturers. From this information, various perimeters can be calculated that are needed for the vector math, such as shown at Step 192. For example, the thickness of the glass can be calculated from the inner and outer surface measurements for the tube face 86, as well as the angle of incidence data, which can be determined from the curvature of the tube face 86, which in turn can be calculated from radius or distance data. At Step 194, the computer system 90, illustrated in FIG. 8, mathematically generates slope coordinate values for various predetermined slope coordinate locations using the vector math disclosed above. This is performed in a manner similar to the manner that it is done empirically, except that the slope coordinate values, representative of the error produced by refraction, can be mathematically calculated using the vector math, and thereby generate a set of slope coordinate values that can be used by the system as described in FIG. 14. At Step 196, the slope coordinate values that have been generated using the vector math are then stored in storage device 96 for use by the system, in the manner described in FIG. 14.

The present invention therefore provides a system for determining X and Y slope coordinate values on a sample monitor in an empirical fashion to allow for correction of refraction in similar monitors. The empirically derived data is highly accurate and requires a minimum amount of storage. Specifications from manufacturers regarding thickness and curvature of the screen surface are not required to calculate the effects of refraction. Interpolation techniques can also be used to determine correction factors for refraction at any location on the screen with a high degree of accuracy.

The foregoing description of the invention has been presented for purposes of illustration and description. Is not intended to be exhaustive or to limit the invention to the precise form disclosed, and other modifications and variations may be possible in light of the above teachings. For example, the tilt angles illustrated in FIGS. 9 and 10 are exemplary and any desired tilt configuration or order can be used in accordance with the present invention. Additionally, interpolation techniques have been employed, but extrapolation can also be used in accordance with the present invention. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of determining X and Y slope values for correcting refraction errors in a cathode ray tube monitor comprising the steps of:

determining a difference between X coordinate locations and between Y coordinate locations of test points generated on said cathode ray tube monitor at first and second tilt angles;

determining X and Y slope values for said test points by dividing said difference between said X coordinate locations of said test points by a difference between X component values of said test points for said first and second tilt angles, and by dividing said difference between said Y coordinate locations of said test points by a difference between Y component values of said test points for said first and second tilt angles.

2. A method of generating a correction factor signal for correcting refraction errors in a cathode ray tube monitor comprising the steps of:

determining a difference between X coordinate locations and between Y coordinate locations of test points generated on said cathode ray tube monitor at first and second tilt angles;

determining X and Y slope values for a plurality of slope coordinate locations by dividing said difference between said X coordinate locations of said test points by a difference between X component values of said test points for said first and second tilt angles, and by dividing said difference between said Y coordinate locations of said test points by a difference between Y component values of said test points for said first and second tilt angles;

determining X and Y slope values for a plurality of points of measurement generated as a result of placing said cathode ray tube at a measured tilt angle by interpolation between said X and Y slope values of said plurality of slope coordinate locations;

generating X and Y correction factors for said points of measurement by multiplying said X and Y slope values for said points by X and Y components of said measured tilt angle, respectively.

3. A method of generating correction factor signals for correcting refraction errors in a cathode ray tube monitor created by glass covering said cathode ray tube monitor comprising the steps of:

positioning said cathode ray tube monitor at a first tilt angle relative to a vision system;

generating a test pattern on said cathode ray tube monitor containing test points;

using said vision system to determine X and Y components of said first tilt angle;

transforming pixel data detected by said vision system to flat plane coordinates for said first tilt angle;

recording a flat plane transformed coordinate location of said test points for said first tilt angle;

positioning said cathode ray tube at a second tilt angle relative to said vision system;

using said vision system to determine X and Y components of said second tilt angle;

transforming pixel data detected by said vision system to flat plane coordinates for said second tilt angle;

recording a flat plane transformed coordinate location of said test points for said second tilt angle;

determining X slope values for said test points by calculating a difference value for X flat plane transformed coordinate locations at said first and second tilt angles and dividing by a difference value equal to the difference between X components for said first and second tilt angles;

determining Y slope values for said test points by calculating a difference value for Y flat plane transformed coordinate locations at said first and second tilt angles and dividing by a difference value equal to the difference between Y components for said first and second tilt angles;

locating slope coordinate locations on said cathode ray tube monitor;

generating a video signal on a monitor to be aligned, said video signal containing points of measurement;

determining X and Y slope values of said points of measurement by interpolation of said X and Y slope values at said slope coordinate locations;

generating X and Y correction factor signals from said X and Y slope values of said points of measurement.

4. An apparatus that generates correction factor signals for correcting refraction errors produced in a cathode ray tube monitor comprising:

a signal generator that generates test points on said cathode ray tube monitor;

a camera aligned with said cathode ray tube monitor at first and second tilt angles that generates a video signal indicating X and Y coordinate locations of said test points on said cathode ray tube monitor;

a storage device that stores said X and Y coordinate locations of said test points for said first and second tilt angles;

a processor that generates:

X and Y coordinate location difference signals that are representative of a difference between X coordinate locations of said test points at said first and second tilt angles, and a difference between Y coordinate locations of said test points at said first and second tilt angles, tilt angle component difference signals that are representative of a difference between X component values of said first and second tilt angles, and Y component values of said first and second tilt angles, X and Y slope signals that are representative of said X and Y coordinate location difference signals divided by said tilt angle component difference signals.

* * * * *